Jan. 14, 1969

R. E. FALK 3,421,318

MULTIPLE DIGITAL SIGNAL TRANSDUCER

Filed May 16, 1966

INVENTOR
RONALD E. FALK
BY Radford W Luther
ATTORNEY

United States Patent Office 3,421,318
Patented Jan. 14, 1969

3,421,318
MULTIPLE DIGITAL SIGNAL TRANSDUCER
Ronald E. Falk, Bristol, Conn., assignor to Chandler Evans Inc., West Hartford, Conn., a corporation of Delaware
Filed May 16, 1966, Ser. No. 550,541
U.S. Cl. 60—39.28                                    16 Claims
Int. Cl. F02g *3/00;* F02c *9/04*

ABSTRACT OF THE DISCLOSURE

A device for producing two electric pulses that are fed into an electronic circuit to simultaneously condition both pulse signals to produce a single pulse width modulated signal to control the operation of a gas turbine. The first pulsed input signal is indicative of relative control actuator position, and the second pulsed input signal is indicative of turbine speed. Appropriate pulse width modulation circuitry designed to receive the pulsed input speed signal and the pulsed input position signal and condition said two input signals to generate a single pulse width modulated output signal that is applied to a proportional solenoid device to position a control actuator responsive to said single pulse width modulated output signal.

---

This invention relates to transducers that supply pulsed intelligence for a plurality of uses in conjunction with digital control systems; and more particularly has reference to a control system in which the relation of the position of a movable point with respect to a fixed point and a speed reference signal are simultaneously provided in the form of discrete electrical pulses. The invention also concerns a pulsed width modulated control unit in which the basic speed reference signal and position feedback signal are supplied in the form of discrete electrical pulses that by proper electrical logic circuitry can be converted into pulse width modulated control information.

For illustrative purposes, the invention will be described with specific reference to an electronic pulse-width-modulated governor for use on a gas turbine engine; its utility in other applications, however, will be readily apparent.

The operational environment of a gas turbine engine is such that an electronic control system presents a flexible method of providing for regulation of the fuel supply to the gas turbine in a reliable and low cost manner. The most significant single feature responsible for determining the character of an electronic control system is the medium of intelligence utilized to sense and transmit the system operational information necessary to perform the control function. A system based upon the use of pulse width modulated information provides a system having the reliability of a wholly digital system with the physical simplicity of an analogue system. A pulse width modulated control system must receive its input intelligence in such a form that it can be readily conditioned and presented in the form of pulse trains. In the instant application, it is desired to provide input control speed and relative position of a movable point in relation to a fixed point intelligence to a pulse width modulated control which can be computed and converted by the control system into a pulse width modulated digital output control signal.

Accordingly, it is an object of the present invention to provide a transducer which will in pulse form indicate the speed of the device being controlled and simultaneously digitally record the positional movement of a control actuator device relative to a fixed point.

Another object of the invention is to provide a mechanical to electrical position transducer that can transduce to pulsed form the speed of the device being controlled and the relative position of a movable point in relation to a fixed point in a format that is compatible with a pulse width modulated electronic control system.

A more specific object of the invention is to provide a mechanical to electrical transducer utilizing a fixed and a movably mounted inductive pickup that will provide pulsed output information that indicates the relative position of a movable point in relation to a fixed point and simultaneously indicates the speed of the member being controlled.

Still another object of the invention is to provide an electrical position transducer with an output indicating the speed of the member being controlled and the relative position of a movable point in relation to a fixed point with the output information directly usable in systems employing digital pulse width information as the medium of intelligence.

Still another object of this invention is to provide a transducer in which mechanical position and speed is converted into electrical pulses to provide a phase shift form of output intelligence indicating relative position of a movable point in relation to a fixed point while simultaneously providing a pulsed indication of the speed of the member being controlled.

Other objects of the invention will in part be obvious and will in part appear hereinafter.

For a fuller understanding of the nature and objects of the invention, reference should be had to the following detailed description taken in conjunction with the accompanying drawings in which.

In order to facilitate an understanding of the operation associated with the use of a pulsed position transducer mechanism in conjunction with a pulsed width modulated digital system, the instant invention will be presented as applied to the operation of a pulsed width modulated gas producer governor system.

Figure 1:
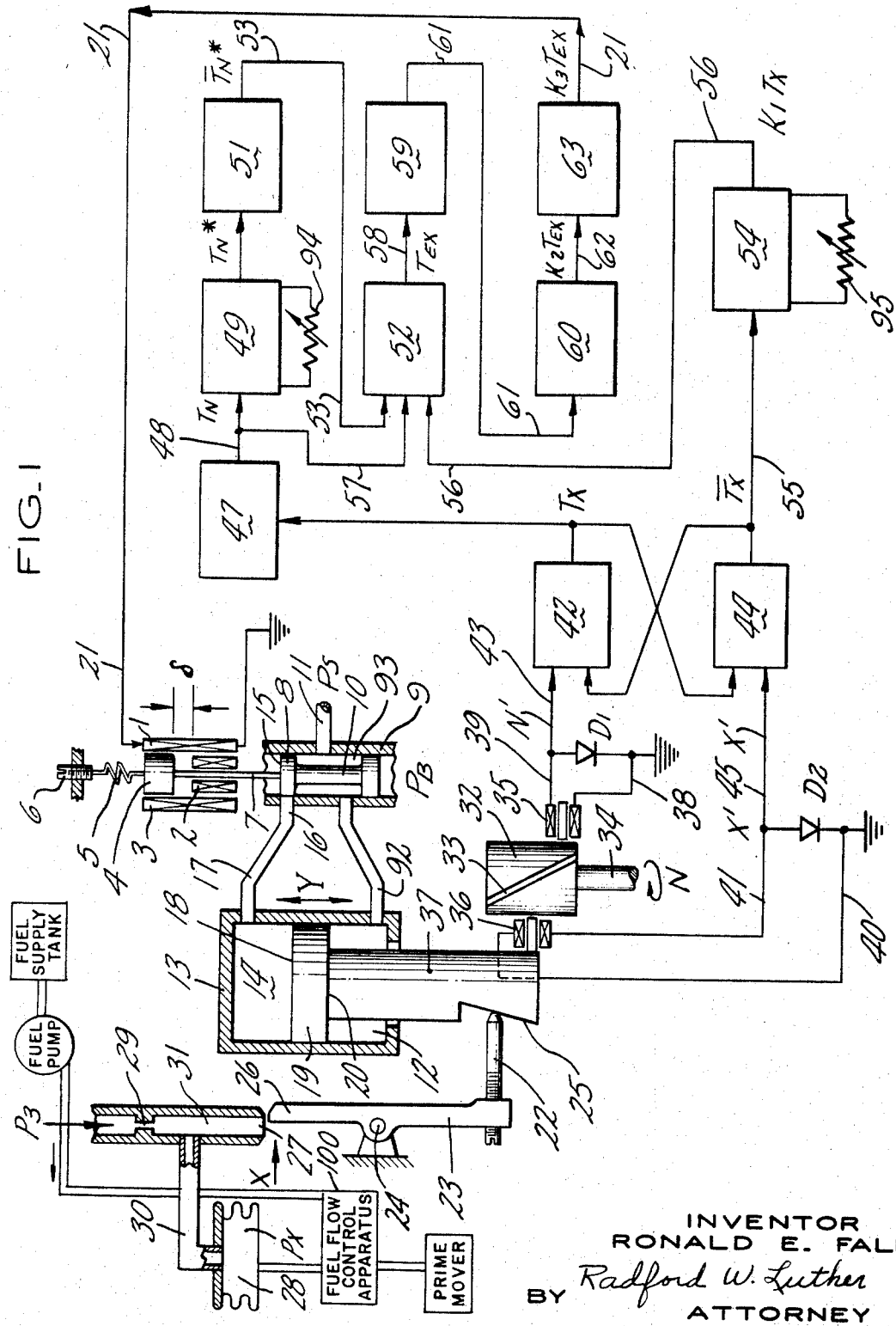
FIGURE 1 is a schematic diagram partly in cross section of a simple gas producer governor mechanism showing the preferred embodiment of the instant invention.

Referring now to the drawings wherein like characters are used throughout to designate like elements, and more specifically to FIGURE 1, wherein is shown generally at 1 a proportional solenoid and spool valve, such devices being well known in the art. The proportional solenoid consists of a magnet 2 maintained in a coil 3. The movable armature 4 is maintained in equilibrium at some initial gap δ away from the magnet 2 by means of spring 5 and adjusting screw 6. Rod 7 fixedly attached to armature 4 and valve spool 8, rigidly connects armature 4 to three-way valve spool 8. Valve spool 8 is contained in valve housing 9 and slideably engages bore 93 of valve housing 9. Pressurized fluid $P_s$ from a source of pressure (not shown) is supplied to chamber 10 of valve housing 9 via conduit 11. Pressurized fluid is conducted from chamber 10 to chamber 12 of piston housing 13 via conduit 92 such that chamber 12 is always subjected to supply pressure. Land 15 of three-way spool valve 8 is positioned relative to port 16 of valve housing 9 such that supply pressure $P_s$ in chamber 10 is metered to chamber 14 via conduit 17 thereby providing a pressure in chamber 14 of magnitude less than supply pressure $P_s$. The position of land 15 relative to port 16 is adjusted by means of adjusting screw 6 such that the product of the reduced pressure in chamber 14 and the abutting surface area 18 of actuator piston 19 is equal in magnitude to the product of area 20 of piston 19 abutting chamber 12 and the supply pressure $P_s$ contained therein. This condition represents the null or balance condition of actuator piston 19. An upward movement of three-way valve 8 such that the opening between land 15 and port 16 is increased to thus increase the pressure in chamber 14 from the null condition will cause actuator piston 19 to move downward and conversely a downward movement of three-way valve 8 such as to connect chamber 14 to drain and hence decrease the pressure in chamber 14 will cause actuator piston 19 to move upward. The spool valve and housing are adjusted so that at some preselected bias current the valve 8 and housing 9 are land-to-land. The bias current is selected to allow symmetrical travel of three-way valve 8. As the current received via conduit 21 is varied, the magnetic force proportional to the current re-positions the armature 4 resulting in a stroke of valve 8 proportional to current.

Upward or downward movement of actuator piston 19 responsive to the appropriate movement of three-way valve 8 will cause cam follower 22 to rotate arm 23 about fixed pivot 24 responsive to variations in displacement of cam 25. The downward movement of actuator piston 19 will cause arm 23 to rotate about pivot 24 in a counterclockwise direction, thus causing valve end 26 to decrease the area of orifice 27 thereby increasing the pressure $P_x$ in control bellows 28 responsive to constant supply pressure $P_3$ provided by a source of pressurized fluid, not shown, and injected into control bellows 28 through fixed orifice 29 and interconnecting passageways 30 and 31. Conversely, an upward movement of actuator piston 19 will cause arm 23 and its associated valve end 26 to move in a clockwise direction thus increasing the area of orifice 27 and reducing the pressure $P_x$ in control bellows 28. The variation of control bellows pressure $P_x$ responsive to the appropriate upward or downward movement of actuator piston 19 produces a variant or modulated pressure $P_x$ that reacts on a metering valve servo to vary the rate of fuel supplied to the device being controlled. The operation of the metering valve servo and its associated metering valve in response to a modulated control bellows pressure $P_x$ as applied to fuel flow control units 100 utilized in conjunction with the actuator system described herein is described in U.S. patent application No. 358,041 of invention Jack O. Nash, filed Apr. 7, 1964, now abandoned, and assigned to the same assignee as the instant application to which reference may be had for a detailed explanation of the metering valve servo and metering valve operation responsive to modulated control bellows pressure.

Figure 2:
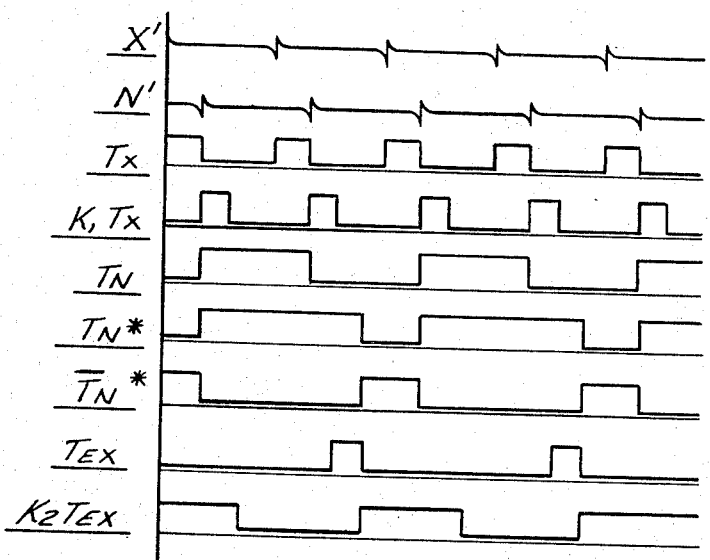
FIGURE 2 is a timing diagram of certain operating characteristics of the digital logic circuitry of the control device shown in FIGURE 1.

A helical gear 32 containing at least one helical tooth 33 is rigidly attached to a drive shaft 34 which in turn is rigidly connected to the device being controlled such that drive shaft 34 and its associated helical gear 32 are driven at a speed N that is proportional to the speed of the device being controlled. A magnetic transducer 35 well known in the art is fixedly placed in the proximity of helical tooth 33 of the gear 32 rotating at speed N. A second transducer 36 similar to transducer 35 is fixedly attached to arm 37 which in turn is rigidly attached to actuator piston 19. The movement of helical tooth 33 past transducer 35 will produce a pulsed signal N′ proportional to engine speed that is transmitted via conduits 38 and 39 to nor gate 42. The movement of helical tooth 33 past transducer 36 will produce a pulse signal X′ via conduits 40 and 41 to nor gate 44. Pulsed signals N′ and X′ when compared through interlatching nor gates 42 and 44 will produce a phase relationship that is proportional to the position Y of actuator piston 19. The phase relationship of the reference pulses N′ of magnetic transducer 35 and the variable pulses X′ of movable transducer 36 are shown by pulse timing curves X′ and N′ of FIGURE 2. The two transducers will produce signals at a frequency N proportional to engine speed which will have a phase relationship proportional to actuator position Y. Pulses N′ are conducted to nor gate 42 via conduit 43. Pulses X′ are conducted to nor gate 44 via conduit 45. The nor gates 42 and 44 are single transistor switches so constructed that an input signal causes the emitter junction to be forward biased causing a short circuit with a resulting ground level output which may be defined as a logic zero or a "zero" output signal. A zero input signal causes the collector to emitter junction to be an open circuit with a resulting collector potential of B+ thus defining a logic one or "one" output signal. Nor gates 42 and 44 are cross coupled in a latching arrangement such that their outputs always assume oppoite states. Their inputs are triggered by each pulse from magnetic transducer signals X′ and N′ in such a fashion as to generate a wave train $T_x$ at N frequency whose pulse width or duty cycle is proportional to Y. The wave train $T_x$ is shown on timing diagram of FIGURE 2. Wave form $T_x$ is conducted via conduit 46 to binary counter 47. Binary counter 47, a digital circuit well known in the art, is so constructed to switch or change state only upon receipt of a negative pulse or a decrease in potential. Binary counter 47 triggered by wave form $T_x$ provides a perfectly symmetrical wave train $T_n$ whose period is inversely proportional to engine speed N. Inversely proportional pulse train $T_n$ as triggered by pulse train $T_x$ is shown in the timing diagram of FIGURE 2. Pulse train $T_n$ is conducted via conduit 48 to one shot multivibrator 49. One shot multivibrator 49, a pulse operated circuit well known in the art, is so constructed to provide a pulse out of constant width for every positive going input pulse regardless of duration. Because the one shot multivibrator is capable of generating a pulsed output dependent exclusively upon an R–C time constant, this output is used as a reference or clock period. One shot multivibrator 49 is triggered by the leading edge of pulse train $T_n$ and has a time constant selected so as to provide an output period inversely proportional to the desired cut-in speed $T_n^*$. The desired speed is selected by varying the magnitude of the resistance of the speed set potentiometer 94 thus varying the R–C time constant of one shot multivibrator 49 thereby providing a variable cut-in speed $T_n^*$. Cut in speed pulse train $T_n^*$ is shown in timing diagram of FIGURE 2. Wave form $T_n^*$ is conducted via conduit 50 to nor gate 51 to provide a complement wave train $\overline{T_n^*}$ of wave train $T_n$. Pulse wave form $\overline{T_o^*}$ is shown on timing diagram of FIGURE 2. Pulse wave train $\overline{T_n^*}$ is conducted to nor gate 52 via conduit 53. Simultaneous with its conduction to one shot multivibrator 49 via conduit 48, wave form $T_n$ is conducted to nor gate 52 via conduit 57. Wave train $\overline{T_x}$, the complement of wave train $T_x$, is conducted to pulse width amplifier 54 via conduit 55 and triggers pulse width amplifier 54 to form wave train $K_1T_x$. Pulse width amplifier 54 is similar to one shot multivibrator 49 except the input is normally kept at the "one" state and let drop to "zero" permitting amplification for a period of time $T_1$ that is less than R–C time constant of the amplifier circuit. The resistance 95 of the R–C time constant is variable thus providing a droop adjustment. Amplified pulse wave train $K_1T_x$, shown on the timing diagram of FIGURE 2, is conducted via conduit 56 to nor gate 52. Nor gate 52 acts as a triple summing point for pulse wave trains $\overline{T_n^*}$, $T_n$ and $K_1T_x$ so as to generate as its output pulse wave train $T_{ex}$, the difference between the combination of overspeed error and position error and the reference signal. Pulse wave train $T_{ex}$ is conducted via conduit 58 to nor gate 59 where wave train $T_{ex}$ is complemented by nor gate 59 and is conducted to pulse width amplifier 60 via conduit 61 to generate pulse train $K_2T_{ex}$ which is conducted via conduit 62 to current amplifier 63. Current amplifier 63 merely acts as an impedance matching device and does not alter the switching nature of wave form $K_2T_{ex}$. The resultant signal is a pulse train logic signal the duty cycle of which is proportional to position error, where position is a function of speed error. When this wave form $K_3T_{ex}$ is applied directly to a proportional electromagnetic actuator 1 or any of several similar devices well known in the art, such as a torque motor, it will have its fundamental and higher order harmonics filtered out, provided that the excitation frequency is considerably higher than the response of the actuator system. The remaining DC level will be proportional to the duty cycle of the original signal. Thus, actuator 18 will respond to the DC or duty cycle value of the original wave form $T_n$ with a position displacement $\Delta\gamma$ that is proportional to the duty cycle of pulse train $T_n$ and speed signal pulse train N'.

Figure 3:
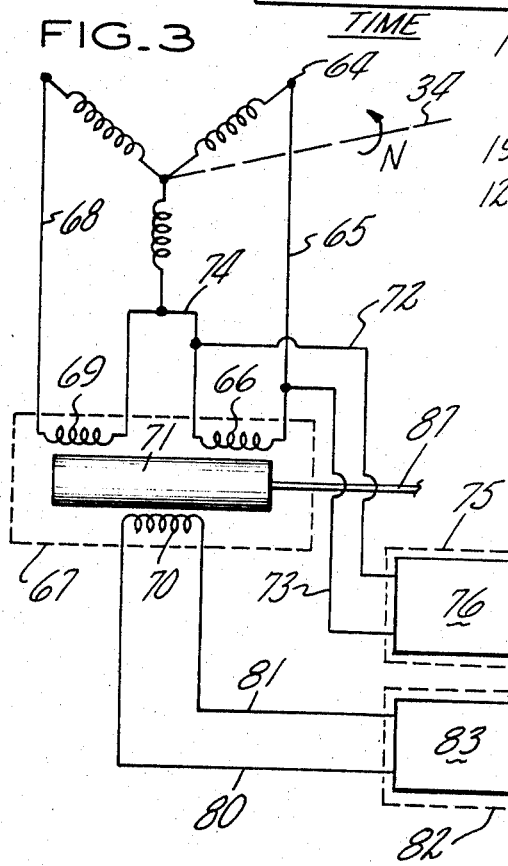
FIGURE 3 is a schematic diagram partly in cross section showing an alternate embodiment of the instant invention.

FIGURE 3 shows an alternate adaptation of a pulse width modulated positioned measurement embodiment wherein the magnetic transducers are replaced by an alternator combined with a movable core transformer having a multiplicity of primary coils and a single secondary coil with said primary and secondary coils wound and positioned so as to produce a single pulsed output from separate multiphase pulsed inputs; said single pulsed output when compared to a fixed pulsed reference signal produces a phase relationship between said pulsed output signal and said reference signal that is proportional to transformer core position.

Referring to FIGURE 3 a multiphase alternator is shown generally at 64 wherein one phase is connected via conduit 65 to one primary winding 66 of a movable core transformer shown generally at 67, and a second phase is connected via conduit 68 to a second primary winding 69 of said transformer. A single secondary coil 70 is positioned relative to primary coils 66 and 69 such that an axial physical displacement of magnetic core piece 71 would vary the magnetic coupling between primary coil 69 and secondary coil 70 and primary coil 66 and secondary coil 70. The magnetic coupling between coil 69 and coil 70 will vary inversely to the magnetic coupling between coil 66 and coil 70, the magnitude of the relative magnetic coupling dependent upon the direction of the displacement of core piece 71 such that primary coil 70 will produce an output pulse signal whose phase when compared to a reference pulse signal is proportional to the axial displacement of core piece 71. Further, since alternator 64 is driven by a drive shaft 34 connected directly to the device being controlled, the pulsed output of one phase of the alternator provides a pulse signal proportional to speed of the device being controlled. The output of one phase of alternator 64 is communicated via conduits 65, 73, 72 and 74 to the signal conditioning circuitry shown generally at 75. The signal conditioning circuitry shown generally at 75 consists of an amplifier 76 and a triggering circuit 77 such that the output $N_s$ of trigger circuit 77 is a pulse wave train that is conveyed via conduits 78 to nor gate 79. Similarly, the output of secondary coil 70 is conveyed via conduits 80 and 81 to signal conditioning circuit shown generally at 82. Signal conditioning circuitry 82 contains an amplifier 83 and a trigger circuit 84, said circuitry being identical to signal conditioning circuitry 75, and provides a pulse output wave form $X_s$ whose phase relationship to pulse output $N_s$ is proportional to the axial displacement of magnetic core piece 71. Pulse signal $N_s$ is conveyed via conduit 85 to nor gate 86. Nor gate 79 is identical to nor gate 42 shown in FIGURE 1, and nor gate 86 is identical to nor gate 44 shown in FIGURE 1. Since the pulse signal $N_s$ produced by a single phase of alternator 64 is a measure of engine speed, the pulse train $N_s$ is identical in function to the pulse N' shown in FIGURE 1. Similarly, the pulse signal $X_s$ produced by the secondary winding of the variable core transformer has a phase relationship to pulse signal $N_s$ that is proportional to the axial displacement of core piece 71. The functions of pulse trains $N_s$ and $X_s$, shown in FIGURE 3, are identical to their respective counterparts N' and X' shown in FIGURE 1. The remainder of the circuitry for use with FIGURE 3 commencing with nor gates 42 and 44, corresponding to nor gates 79 and 86, is identical to that of FIGURE 1. The function of $N_s$ is identical to N' shown in timing diagram of FIGURE 2, and $X_s$ is identical to X' as shown in timing diagram of FIGURE 2. The output of nor gates 79 and 86 is pulse train $T_x$ whose width or duty cycle is proportional to the axial displacement of core piece 71. Core piece 71 is fixedly connected to actuator piston shaft 37 by interconnecting rod 87. Thus the axial movement of core piece 71 corresponds to bidirectional axial movement of actuator piston 19. Hence the width or duty cycle of pulse train $T_x$ is proportional to the displacement of actuator piston 19. Thus the multiphase alternator shown generally at 64 in combination with a movable core transformer having a multiplicity of primary windings and a single secondary winding interact to provide a singled pulsed output signal whose phase when compared to a reference pulse signal is proportional to actuator piston displacement while simultaneously producing a pulsed signal whose frequency is a measure of the speed of the device being controlled.

Figure 4:
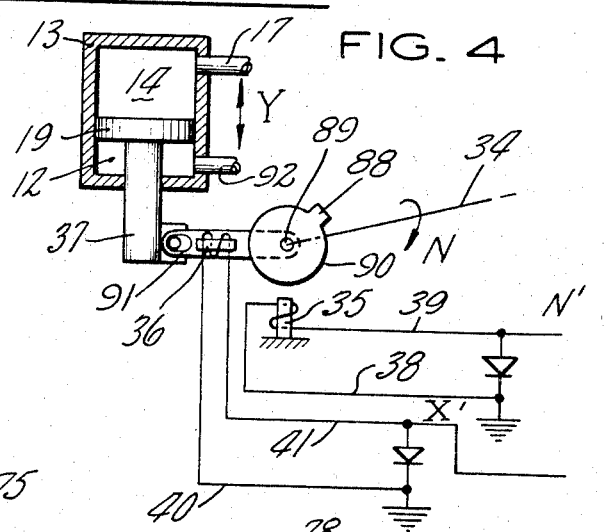
FIGURE 4 is a schematic diagram partly in cross section showing a second alternate embodiment of the instant invention.

FIGURE 4 shows a second alternate adaptation wherein the helical gear shown as 32 in FIGURE 1 is replaced by a gear haivng a single tooth 88 positioned parallel to the axis of rotation 89 of the gear 90. The fixed transducer 35 is positioned and utilized exactly as shown in FIGURE 1. The second transducer 36 is rigidly mounted to arm 91. Arm 91 is rotatably mounted to fixed axis 89 at one end and is pivotably mounted to arm 37 of actuator piston 19 at the opposite end of said one end. Bidirectional axial movement of actuator piston 19 will cause arm 91 and rigidly attached transducer 36 to pivotably rotate about fixed axis 89 such that the relationship of the pulses X' to N' as tooth 88 passes transducers 35 and 36 respectively is a function of the axial displacement Y of actuator piston 19. This action produces a pulsed output N' and a pulsed output X' whose function is identical to that explained in detail above for the operation of FIGURE 1. The pulses N' and X' produced by the embodiment shown in FIGURE 4 operate in precisely the same manner as the N' and X' of FIGURE 1, and the balance of the circuitry utilized with the embodiment shown in FIGURE 4 is identical to that shown in FIGURE 1. Thus the embodiment shown in FIGURE 4 is a variation of the organization shown in FIGURE 1 whereby rotary displacement of the variable transducer can be utilized to provide the position feedback signal provided by the lead of helical tooth 33 of gear 32 shown in FIGURE 1.

Movement of position mechanism 18 is effective to change the speed of the speed responsive mechanism 32.

The speed responsive pulse N' provides a pulse $\overline{T_{n_*}}$ of the same frequency but of a different length, whose length is adjustable by potentiometer 94. The speed pulse N' is compared with the phase displaced position pulse X' to provide pulse $\overline{T_x}$ whose width is proportional to the phased displacement and provides a pulse $K_1T_x$ whose width is also proportional to the phased displacement and which proportion may be adjusted by potentiometer 95. These two pulses, phase responsive pulse $K_1T_x$ and speed responsive pulse $T_n$ are in effect added and their sum subtracted from fixed length pulse $\overline{T_{n_*}}$ to provide a pulse $T_{ex}$ whose length is a measure of the phased displacement of the two original pulse tignals and which width may be adjusted by potentiometer 94 to provide a different speed selection, and by potentiometer 95 to provide a different phase relation. The pulse $K_3T_{ex}$ obtained from pulse $T_{ex}$ still has a frequency equal to the speed frequency and a width proportional to the phase difference. Pulse $K_3T_{ex}$ is fed to the solenoid 4 which adjusts the position mechanism and changes the phase relation of the pulses.

If while in a steady state condition the potentiometer 94 is adjusted for an increase in speed, the pulse $\overline{T_{n_*}}$ is shortened with a result that pulse $T_{ex}$ is shortened and the energy fed to solenoid 4 in pulse $K_3T_{ex}$ is reduced to move piston 10 up and piston 18 down and increase the energy fed to the prime mover. At the same time, the phase difference is reduced by movement of piston 18 down which will shorten the pulse $K_1T_x$ which will act as a negative feedback to increase the length of pulse $T_{ex}$ and the energy in pulse $K_3T_{ex}$ and reduce the effect of the reduction in $\overline{T_{n*}}$ by potentiometer 94 and its effect on piston 18. This feedback function acts to stabilize the system. As the mechanism picks up speed, the frequency of the constant width pulses increases which will increase the energy applied to solenoid 4 and move piston 18 up and reduce the energy applied to the prime mover and tend to decrease speed. The mechanism will eventually settle out at an increased speed and a changed position of piston 18 which will give a reduced phase difference pulse $K_1T_x$ which will increase the length of pulse $T_{ex}$ which will, with the increased energy due to the increased speed, balance out the reduced $\overline{T_{n*}}$ pulse produced by adjustment of potentiometer 94 for an increased speed and thus return piston 10 to a neutral position. If the potentiometer 95 is changed to increase the width of pulse $K_1T_x$ which will result in a decrease in the width of pulse $T_{ex}$ the energy fed to the solenoid is decreased and the piston 18 lowered to increase the energy fed to the prime mover and simultaneously decrease the phase difference between the original signals. The increased energy to the prime mover will increase the speed and frequency which will increase energy fed to solenoid 4 and thus move piston 10 down towards its null position. The mechanism will settle out with a reduced phase difference and an increased speed which will cancel the effect of the reduced phase difference and return the piston 10 to its null position.

There is thus provided a speed responsive digital pulse governor control with a speed control and position negative feedback for stability of control.

The apparatus shown generally as actuator 13, pilot valve 9, speed and position responsive pulse producing units 33, 35, 36, 42 and 44 in FIGURE 1, and the respective alternate embodiments shown in FIGURES 3 and 4 combine with electronic digital control circuitry shown generally at 47 through 63 in FIGURE 1 to provide an electronic digital pulse actuated speed responsive governor that performs the same function electronically that the speed responsive mechanical flyball governor, shown generally at 91 in FIGURE 2 of previously referenced U.S. application No. 358,041 of inventor Jack O. Nash, filed Apr. 7, 1964, does mechanically, with the exception the mechanical flyball governor as shown does not incorporate the position feedback feature included in the electronic governor of the instant invention.

While the preferred embodiments of the invention have been shown, it is to be understood that this invention is not limited to the precise construction and arrangement of elements disclosed by way of illustration since these may be changed and modified by those skilled in the art without departing from the spirit of the invention or exceeding the scope of the appended claims.

What I claim is:

1. Apparatus producing a plurality of digital outputs to operate a digitally actuated position and speed responsive control device controlling fuel flow regulating apparatus to thereby control a prime mover comprising; means including signal generating means fixedly secured to displaceable means generating a plurality of phase related electrical outputs, at least one of said phase related electrical outputs indicative of the speed of said prime mover, signal processing means connected to said generator means to receive two of said phase related electrical outputs including said speed indicative output causing said two received outputs to be processed as digital signals that exhibit a temporal relationship indicative of bidirectional displacement of said displaceable means of said control device while said speed indicative output is processed as a digital signal that coincidently indicates the speed of said prime mover.

2. A signal producing control device for providing a plurality of digital signals to a digitally actuated control device regulating fuel flow means to thereby control a prime mover comprising, rotative means including signal generating means fixedly secured to bidirectionally displaceable means generating a plurality of output signals, means connected to said rotative means to receive two of said output signals and discharge two digital signals, each digital pulse of said two digital discharge signals having a temporal relationship each finite value of which is indicative of a finite displacement of a member of said bidirectionally physically displaceable means of said control device while the frequency of each digital pulse of one of said two diigtal discharge signals indicates the speed of said prime mover.

3. A control signal producing device for providing a plurality of digital output signals to actuate a digital control device controlling fuel flow apparatus to thereby control a prime mover comprising, first means generating a first output signal indicative of the speed of said prime mover, second means including signal generating means fixedly secured to a movable member, said second means generating a second output signal, means connected to said first means and said second means and actuated by said first and said second output signals such that a digital output pulse is produced whereby each finite width of said digital pulse is indicative of a finite displacement of a member of said control device and the frequency of said digital pulse is indicative of the speed of said prime mover.

4. A device as claimed in claim 3 wherein said first means comprises a fixed induction coil, a gear having a helical tooth positioned thereon said gear rotating in the proximity of said fixed induction coil such that an electrical pulse is generated with each passage of said helical tooth by said fixed induction coil.

5. A device, as claimed in claim 4, wherein said second signal generating means comprises a second induction coil constructed to be axially movable in relation to the axis of rotation of said gear and angularly fixed in relation to said first coil, said second induction coil positioned adjacent said gear such that a pulse is generated with each passage of said tooth past said second induction coil.

6. A device, as claimed in claim 5, wherein said second induction coil is fixedly connected to said movable member such that axial displacement of said control member causes corresponding axial displacement of said second induction coil.

7. A device as claimed in claim 6 wherein said means connected to said first and said second induction coils comprises a first gate connected to said first coil and a second gate connected to said second coil, said first and said second gates each receiving a separate input pulse, said gates interconnected to provide a single output pulse whereby each pulse from said first induction coil initiates a single output pulse from said combined first and second gates and each pulse from said second induction coil terminates each of said output pulses from said combined first and second gates such that the width of each of said output pulses is proportional to the axial displacement of said control member and the frequency of said output pulses is proportional to the speed of said prime mover.

8. A device as claimed in claim 3 wherein said first means comprises a fixed induction coil, a gear having a tooth positioned parallel to the axis of rotation of said gear and integral with said gear, said gear rotating in the proximity of said first induction coil such that an electrical pulse is generated with each passage of said tooth past said first induction coil, and said second means comprises a member rotatively positioned adjacent said gear and rotatable about the axis of rotation of said gear, a second induction coil fixedly secured to said member and positioned adjacent said gear such that an electrical pulse is generated upon each passage of said tooth past said second induction coil.

9. A device as claimed in claim 8 wherein said member is pivotably connected to said control member such that axial displacement of said control member causes a corresponding angular displacement of said first member and its fixedly attached second induction coil.

10. A device as claimed in claim 9 wherein said means connected to said first and said second induction coils comprises a first gate connected to said first coil and a second gate connected to said second coil, said first and said second gates each receiving a separate input pulse, said gates interconnected to provide a single output pulse whereby each pulse from said first induction coil initiates a single output pulse from said combined first and second gates and each pulse from said second induction coil terminates each of said output pulses from said combined first and second gates such that the width of each of said output pulses is proportional to the axial displacement of said control member and the frequency of said output pulses is proportional to the speed of said prime mover.

11. A device, as claimed in claim 3, wherein said first and said second signal generating means comprises a multiphase alternator in which one phase produces said first output signal and said second phase produces said second output signal.

12. A device as claimed in claim 11 wherein said means connected to said first and said second output signals comprises a variable induction movable core transformer wherein said first phase of said alternator is connected to a first primary coil of said transformer and said second phase of said alternator is connected to said second primary coil of said transformer, said displacement being so constructed that said first and said second output signals are combined through said movable core and a single secondary transformer coil into a composite single output signal.

13. A device as claimed in claim 12 wherein said movable core of said transformer is fixedly connected to a control member such that axial displacement of said control member causes a corresponding axial displacement of said movable core.

14. A device as claimed in claim 13 wherein said means connected to said first and said second output signals comprises in combination with said transformer a first gate connected to said first phase of said alternator and a second gate connected to said secondary winding of said transformer, said first and said second gates interconnected such that each gate receives separate input pulses which are combined to provide a single output pulse with each pulse from said first alternator phase initiating said single output pulse from said combined first and said second gates and each pulse from said secondary winding of said transformer terminating each of said output pulses from said combined first and second gates such that the width of said output pulses is proportional to the axial displacement of said control member and the frequency of said output pulses is proportional to the speed of said prime mover.

15. Digital pulse actuated fuel flow and speed control means regulating the operation of a prime mover, said control means having a movable speed control member means producing pulses in timed relation to the speed of said prime mover, means including means fixedly secured to a bidirectionally axially displaceable member producing pulses phase related to said first mentioned prime mover speed related pulses in accordance with the position of said speed control member means, means combining said pulses to produce a digital electrical output responsive to both speed and the position of said axially displaceable member, and means actuated by said digital output signal to move said axially displaceable member and maintain a selected speed modified by the position of said axially displaceable member.

16. A control signal producing device for providing a plurality of digital output signals to actuate a digital control device to control a fuel flow apparatus and thus control the operation of a prime mover comprising, first means generating a first output signal indicative of the speed of said prime mover, second means including signal generating means fixedly secured to a displaceable member generating a second output signal, means connecting said first means and said second means and actuated by said first and said second output signals such that a digital output pulse is produced whereby each finite width of said digital output pulse is indicative of a finite displacement of a member of said control and the frequency of said digital output pulse is indicative of the speed of said prime mover.

References Cited

UNITED STATES PATENTS

| | | | |
|---|---|---|---|
| 2,145,117 | 1/1939 | Keller | 91—366 |
| 2,458,325 | 1/1949 | Warren | 91—366 |
| 2,790,090 | 4/1957 | Hinde et al. | 91—363 |
| 2,883,975 | 4/1959 | Spetner | 91—363 |
| 3,011,110 | 11/1961 | Yu-Chi Ho et al. | 91—363 |
| 3,266,378 | 8/1966 | Show | 91—363 |
| 3,038,449 | 6/1962 | Murphy et al. | 91—363 |
| 3,348,559 | 10/1967 | Brothman et al. | 137—26 |

FOREIGN PATENTS 265,630  3/1950  Switzerland.

PAUL E. MASLOUSKY, *Primary Examiner.*

U.S. Cl. X.R.

137—30, 36, 26; 91—361, 366